United States Patent [19]

Ueda

[11] Patent Number: 5,606,727
[45] Date of Patent: Feb. 25, 1997

[54] METHOD AND APPARATUS FOR ADAPTIVE CHANNEL ASSIGNMENT IN A MOBILE COMMUNICATION SYSTEM

[75] Inventor: Tetsuro Ueda, Tokyo, Japan

[73] Assignee: NEC Corporation, Tokyo, Japan

[21] Appl. No.: 356,724

[22] Filed: Dec. 15, 1994

[30] Foreign Application Priority Data

Dec. 22, 1993 [JP] Japan .................. 5-324852

[51] Int. Cl.$^6$ .................. H04B 7/26
[52] U.S. Cl. .................. 455/34.1; 455/33.1; 455/54.1; 455/62; 455/67.1
[58] Field of Search .................. 455/33.1, 34.1, 455/34.2, 54.1, 54.2, 56.1, 62, 63, 67.1; 379/59, 61

[56] References Cited

U.S. PATENT DOCUMENTS

| | | | |
|---|---|---|---|
| 5,093,924 | 3/1992 | Toshiyuki et al. | 455/34.1 |
| 5,418,839 | 5/1995 | Knuth et al. | 455/34.1 |

FOREIGN PATENT DOCUMENTS

| | | | |
|---|---|---|---|
| 2-141036 | 5/1990 | Japan | 455/34.1 |
| 3-131130 | 6/1991 | Japan | 455/34.1 |

OTHER PUBLICATIONS

"Personal Digital Cellular Telecommunications System, RCR Standard–27 B," Research and Development Center for Radio Systems (RCR), pp. 208; 235; 325–328.

Primary Examiner—Chi H. Pham
Attorney, Agent, or Firm—Foley & Lardner

[57] ABSTRACT

Each of base stations 2 is positioned in a radio zone composed of three sectors and has a base station controller 3. The base station controller 3 measures upstream interference signal levels in all directions with receiving sector antennas 11, 13, 15 or omnidirectional antenna 17, determines candidate channels for assignment to the mobile stations 18, indicates the candidate channels to the mobile stations 18, instructs each of the mobile stations 18 to measure and report downstream interference signal levels to the base station controller 3, and then determines channels to be assigned. When determining candidate channels for assignment to the mobile stations 18, the base station controller 3 rearranges candidate channels into an order of an ascending order of upstream interference signal levels based on the measured upstream interference signal levels, and assigns candidate channels to groups of mobile stations 18.

8 Claims, 8 Drawing Sheets

METHOD AND APPARATUS FOR ADAPTIVE CHANNEL ASSIGNMENT IN A MOBILE COMMUNICATION SYSTEM

BACKGROUND OF THE INVENTION

1. Field of the Invention

The present invention relates to a mobile communication system for radio zones each divided into sectors, and more particularly to a mobile communication system having a plurality of base stations positioned respectively in a plurality of radio zones each divided into a plurality of sectors, a plurality of sector antennas positioned respectively in the sectors of each of the radio zones, and a plurality of mobile stations that can be connected to the base stations through radio transmission paths, the mobile communication system being capable of transmitting and receiving a call by way of dynamic channel assignment based on simultaneous use of the same frequency or time slot under conditions free of mutual interference between the base stations.

2. Description of the Prior Art

One conventional mobile communication system for radio zones divided into sectors is disclosed in "Personal Digital Cellular Telecommunication System, RCR Standard—27B" published by Research & Development Center for Radio Systems (RCR). A dynamic channel assignment process which uses a desired-to-interference signal level ratio for assigning channels to incoming and outgoing calls in the conventional mobile communication system will be described below with reference to FIG. 1 of the accompanying drawings.

The term "channel" used below in the dynamic channel allocation process represents a channel as a unit slot. The term "upstream" refers to a direction toward a base station, and the term "downstream" refers to a reverse direction.

Each base station measures upstream interference signal levels in all communication channels using only sector antennas at all times in a step S1. Thereafter, when there is an outgoing/incoming call request from a mobile station in a step S6, the base station measures upstream desired signal levels in all the communication channels using the sector antennas, and calculates upstream desired-to-interference signal level ratios in all the communication channels in a step S2. Then, the base station selects an unused channel with the greatest upstream desired-to-interference signal level ratio as a candidate channel for assignment in a step S8. The base station requests the mobile station to measure a downstream interference signal level in the candidate channel for assignment in a step S18. In response to the request, the mobile station measures the downstream interference average signal level in the candidate channel for assignment in a step S5, and then reports the measured average downstream interference signal level to the base station in a step S20. The base station calculates a downstream desired-to-interference signal level ratio using, as a downstream desired signal level, the received level in its own zone of the outgoing or incoming radio condition report, in a step S11. If the calculated downstream desired-to-interference signal level ratio is equal to or greater than a predetermined signal level ratio threshold in a step S12, then the base station determines the candidate channel for assignment as usable in a step S16. The base station indicates the candidate channel for assignment as a communication channel to the mobile station in a step S13, and starts communicating with the mobile station in a step S15. If the calculated downstream desired-to-interference signal level ratio is smaller than the predetermined signal level ratio threshold in the step S12, then the base station determines the candidate channel for assignment as unusable in a step S17. The base station selects a new candidate channel for assignment in the step S8, and repeats the steps S8 through S12 until a usable candidate channel for assignment is found in the step S16.

The above dynamic channel assignment process in the conventional mobile communication system will be described in greater detail with reference to FIGS. 1 and 2 of the accompanying drawings.

As shown in FIG. 2, the radio zone of a base station 91 is divided into three sectors 95, 96, 97, and the radio zone of a base station 92 is divided into three sectors 98, 99, 100. A mobile station 93 is positioned in the sector 96 for the base station 91, and a mobile station 94 is positioned in the sector 99 for the base station 92. It is now assumed that while the mobile station 93 is communicating with the base station 91, the mobile station 94 sends an outgoing call to the base station 92, which assigns the same channel as the channel that is being used between the mobile station 93 and the base station 91. The sectors 95, 96, 97 are oriented with respect to the base station 91 in the same manner as the sectors 98, 99, 100 are oriented with respect to the base station 92. An upstream interference signal 106 from the mobile station 93 to the base station 92 is attenuated to a large degree because the mobile station 93 is in the opposite direction to the main beam in the sector 99. However, a downstream interference signal 105 from the base station 91 to the mobile station 94 is attenuated to a small degree because the mobile station 94 is in the same direction as the main beam in the sector 96.

In the dynamic channel assignment process shown in FIG. 1, the base station 92 determines a candidate channel for assignment in the step S8 without taking into account a downstream desired(104)-to-interference signal level ratio. Therefore, while an upstream desired(103)-to-interference signal level ratio threshold is being satisfied, a downstream desired(104)-to-interference signal level ratio threshold is not satisfied in the step S17. The number of signals (the steps S18, S20) between the base and mobile stations and the number of times that the level of the downstream interference signal 105 is measured (the step S5) are increased until an assigned channel is determined.

Another disadvantage is that a communication channel cannot quickly be determined as the level of the downstream interference signal 105 is measured by the mobile station 94 in the step S5 after the outgoing/incoming call.

SUMMARY OF THE INVENTION

It is therefore an object of the present invention to provide a mobile communication system for radio zones each divided into sectors which is capable of suppressing an increase in the number of signals which is caused by the directivity of sector antennas at the time an outgoing/incoming call is made and also of shortening the time required to measure downstream interference signal levels at the time an outgoing/incoming call is made.

To achieve the above object, there is provided in accordance with the present invention a mobile communication system comprising a plurality of base stations positioned respectively in a plurality of radio zones each divided into a plurality of sectors, a plurality of sector antennas positioned respectively in the sectors of each of the radio zones, and a plurality of mobile stations that can be connected to the base stations through radio transmission paths, the arrangement being such that the mobile communication system is capable of transmitting and receiving a call by way of dynamic channel assignment based on simultaneous use of the same frequency or time slot under conditions free of mutual interference between base stations, each of the base stations comprising upstream interference signal level measuring means for measuring upstream interference signal levels in communication channels of the mobile stations in all directions always, means for determining candidate channels for assignment to the mobile stations based on the upstream interference signal levels measured by the upstream interference signal level measuring means, and means for indicating channel numbers of the candidate channels for assignment to all the mobile stations in the radio zone in which the base station is positioned, each of the mobile stations comprising means for receiving the channel numbers of the candidate channels and measuring downstream interference signal levels in the candidate channels, and means for simultaneously reporting the downstream interference signal levels in the candidate channels to the base station when a call is transmitted and received.

The upstream interference signal level measuring means may measure upstream interference signal levels with all the sector antennas associated with each of the base stations.

The mobile communication system may further include an omnidirectional antenna and an omnidirectional receiver connected to the omnidirectional antenna associated with each of the base stations, and the upstream interference signal level measuring means measures upstream interference signal levels from the mobile stations using the omnidirectional antenna and the omnidirectional receiver.

The means for determining candidate channels for assignment to the mobile stations may rearrange the candidate channels into an ascending order of upstream interference signal levels based on the measured upstream interference signal levels in the communication channels, and assign the candidate channels to groups of the mobile stations.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 8 is a diagram of a format of a level report request in the process illustrated in FIG. 4;

FIG. 9 is a diagram of a format of a level report in the process illustrated in FIG. 4.

DETAILED DESCRIPTION OF THE PREFERRED EMBODIMENT

Figure 3:
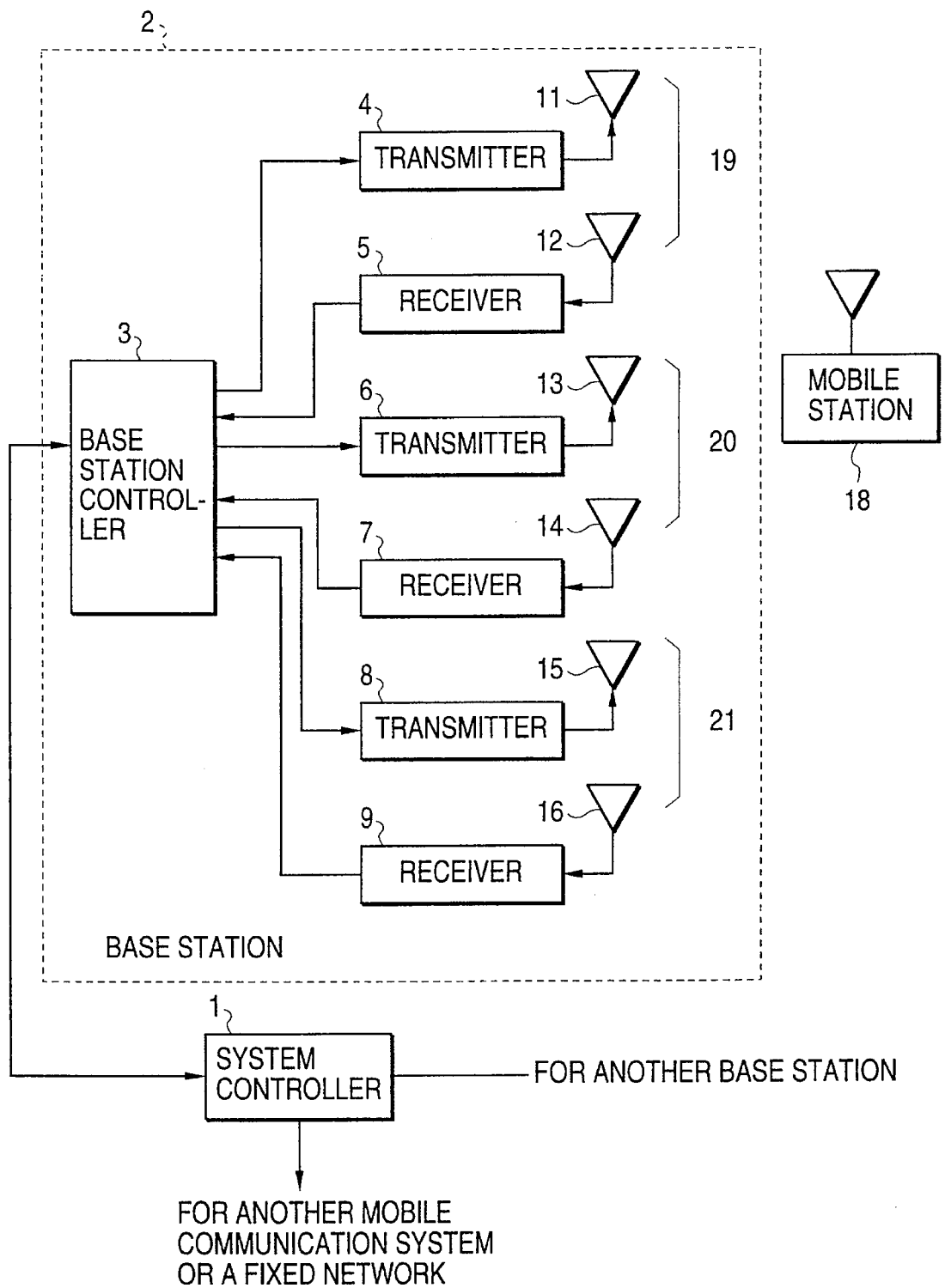
FIG. 3 is a block diagram of a first embodiment of a mobile communication system for radio zones each divided into sectors according to the present invention.

As shown in FIG. 3, a mobile communication system for radio zones each divided into sectors according to the present invention comprises a system controller 1, a plurality of base stations 2 (one shown), and a plurality of mobile stations 18 (one shown).

The system controller 1 is connected to another mobile communication system or a fixed network and another base station (or stations), and serves to control the mobile communication system in its entirety. The base stations 2 are connected to the system controller 1, and are positioned in respective radio zones. The radio zone of each of the base stations 2 is divided into three sectors 19, 20, 21. The base station 2 has transmitting sector antennas 11, 13, 15 for the respective sectors 19, 20, 21, transmitters 4, 6, 8 connected respectively to the transmitting sector antennas 11, 13, 15, receiving sector antennas 12, 14, 16 for the respective sectors 19, 20, 21, receivers 5, 7, 9 connected respectively to the receiving sector antennas 12, 14, 16, and a base station controller 3. The base station controller 3 controls channel assignment and the base station 2 as a whole. The base station controller 3 also has an upstream interference signal level measuring means (not shown) for detecting the levels of upstream interference signals in communication channels in all directions with the receiving sector antennas 12, 14, 16 and the receivers 5, 7, 9. Each of the mobile stations 18 is connected to the base station 2 through radio communication paths, and communicates with the closest sector covered by the base station 2.

A process of assigning a channel in response to a communication request from the mobile station 18 in the mobile communication system will be described below with reference to FIGS. 3 and 4.

The status of the base station 2 prior to a call will first be described below.

Figure 1:
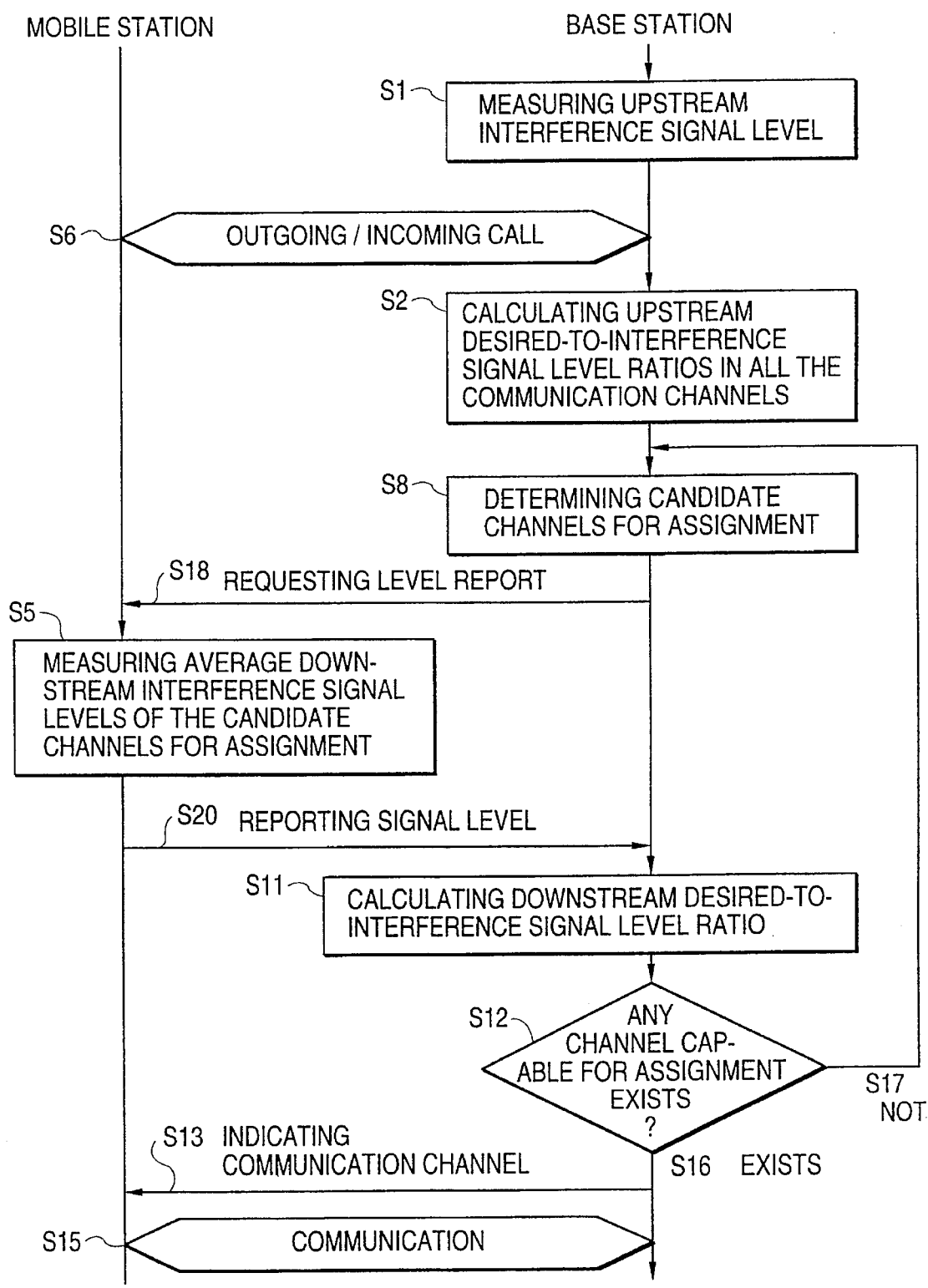
FIG. 1 is a flowchart of a conventional process of channel assignment at the time an outgoing/incoming call is made in a mobile communication system for radio zones each divided into three sectors.
Figure 2:
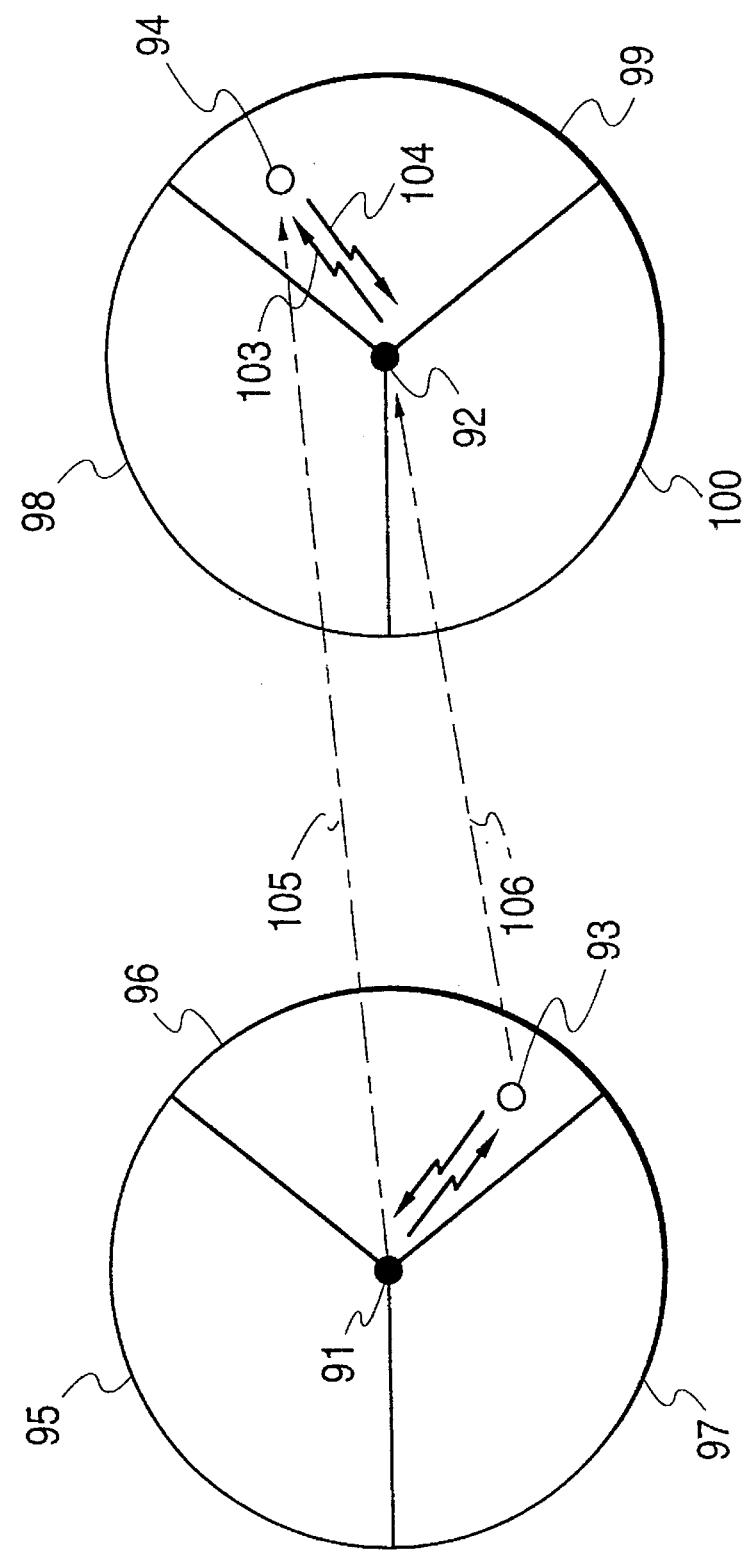
FIG. 2 is a diagram of a mobile communication system for radio zones each divided into three sectors according to the present invention, the view showing the correlation between an upstream desired-to-interference signal level ratio and a downstream desired-to-interference signal level ratio.

In order to eliminate the difference between upstream interference signal level attenuation and downstream interference signal level attenuation due to the directivity of sector antennas as described above with reference to FIG. 2, the base station controller 3 measures upstream interference signal levels in a step S1 with the upstream interference signal level measuring means. In the embodiment shown in FIG. 3, the base station controller 3 always measures upstream interference signal levels using all the sector antennas 12, 14, 16.

Based on the measured upstream interference signal levels, the base station controller 3 determines candidate channels for assignment to the mobile station 18 in a step S3. In a next step S4, the base station controller 3 indicates the determined candidate channels for assignment to all the mobile stations 18 associated with the base station 2.

A process of determining candidate channels for assignment to the mobile station 18 and a process of indicating the candidate channels to the mobile station 18 using a paging channel (PCH) will be described below with reference to FIGS. 5 and 6.

Figure 5:
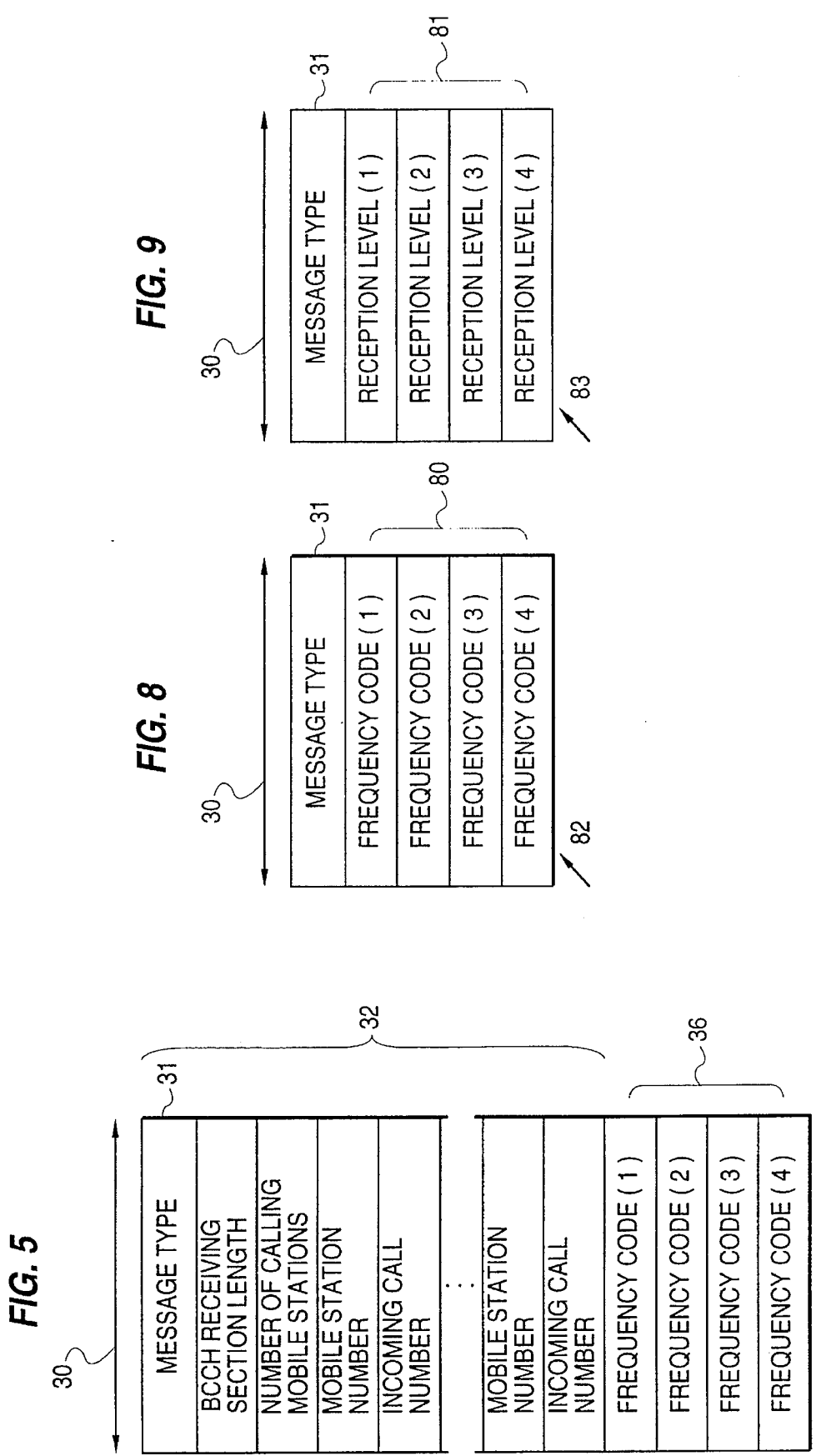
FIG. 5 is a diagram showing a format of a paging channel (PCH) used in the process illustrated in FIG. 4.

FIG. 5 shows a format of a paging channel (PCH) used in this process. As shown in FIG. 5, the format of the paging channel includes calling frequency codes 36 of one octet 30 which are added to a conventional calling format 32. For illustrative purpose, the calling frequency codes 36 include four frequency codes (1), (2), (3), and (4).

Figure 6:
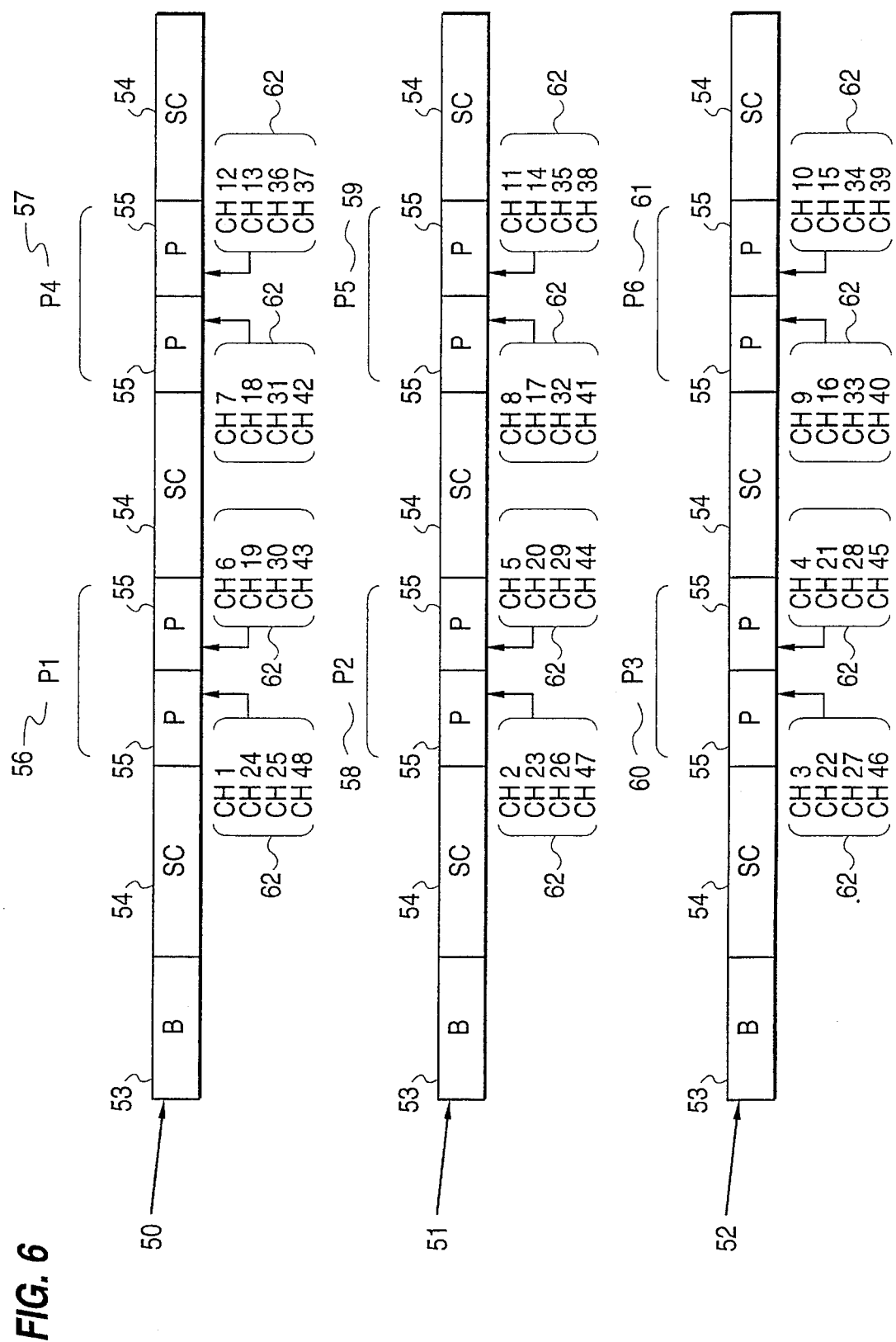
FIG. 6 is a diagram showing channel assignment for measuring mobile station levels in common control channels used in the process illustrated in FIG. 4.

FIG. 6 shows a structure of common control channels used in the mobile communication system. For illustrative purpose, one base station has three common control channels, and there are two groups of paging channels (PCH) per common control channel. More specifically, as shown in FIG. 6, the three common control channels include a B channel (BCCH: broadcast channel) 53, SC channels (SCCH: individual signaling channel) 54, and P channels (PCH: paging channel) 55, and the P channels 55 are classified into six paging channel groups (P1~P6) 56–61. Each of the paging channels (PCH) comprises a paging channel (PCH) having the format shown in FIG. 5.

The base station controller 3 determines, in the step S3, candidate channels for assignment as paging channels based on the sequence of communication channels that have been rearranged in an ascending order of the upstream interference signal levels measured by the upstream interference signal level measuring means. Then, in a step S4, the base station controller 3 indicates or broadcasts the determined candidate channels simultaneously to all the mobile stations belonging to the base station 2 using the common control channels 50, 51, 52 shown in FIG. 6.

Candidate channels may be assigned as paging channels such that, as shown in FIG. 6, the total of communication channel numbers of the forty eight highest ranking communication channels (CH 1~CH 48) whose upstream interference signal levels are arranged in ascending order, which correspond to the frequency codes of the paging channels (PCH), becomes "98". In this case, the average interference signal level remains substantially the same.

Upon indication of the candidate channels in the step S4, each of the mobile stations 18 measures downstream interference signal levels in all the indicated candidate channels, averages the measured downstream interference signal levels in the respective channels, and updates the average levels at all times in a step S5.

Figure 7:
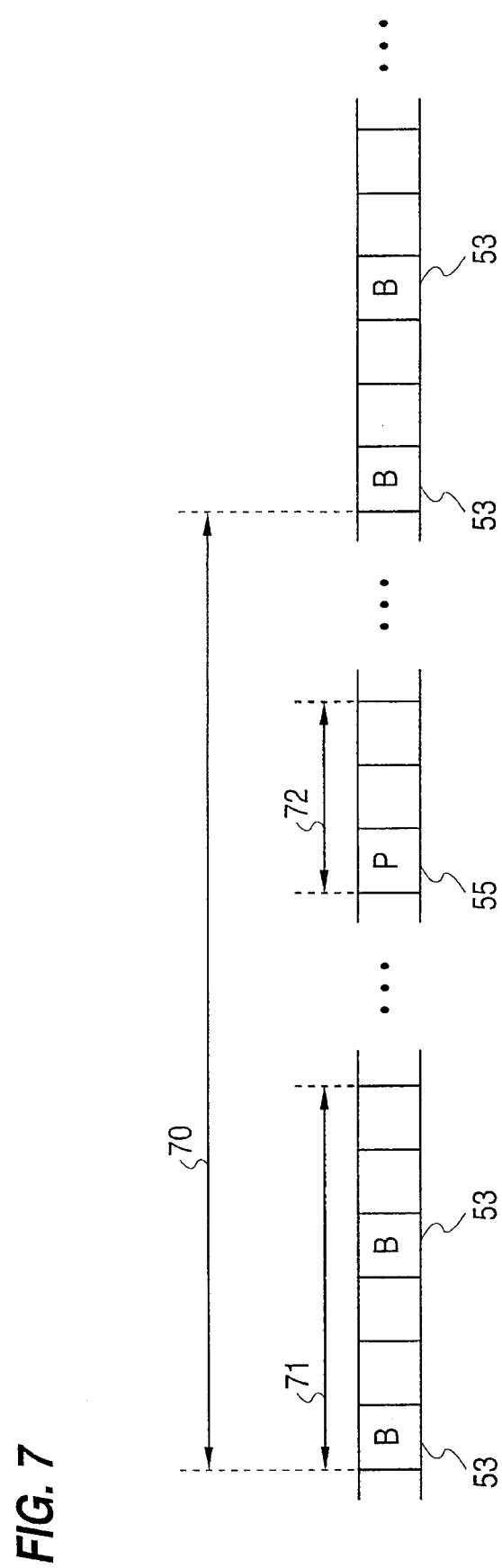
FIG. 7 is a diagram illustrative of an intermittent receiving operation in the process illustrated in FIG. 4.

A process of calculating a candidate channel for assignment in the mobile station 18 and a process of measuring a downstream interference signal level in the candidate channel at the time candidate channels for assignment are indicated using the paging channels (PCH) and the common control channels shown in FIGS. 5 and 6 will be described below with reference to FIG. 7.

The paging channels which have heretofore been used for paging the mobile stations 18 are used not only to page the mobile stations 18 but also to indicate candidate channels to the mobile stations 18 before an outgoing/incoming call is made.

During intermittent reception, the mobile station 18 determines the number Jp of a paging channel (PCH) used in its own group of paging channels defined by the RCR Standard—27B, referred to above, according to the following equations:

$$n'=(n-1)\cdot mod(Nc \times Np)+1$$

$$Jp=[(n'-1)/Ap]+1$$

where $[(n'-1)/Ap]$: a maximum integer not exceeding $(n'-1)/Ap$;

n: the decimal notation of two low-order octets of a mobile station number;

Nc: the number of physical control channels in a sector;

Np: the number of paging channel (PCH) groups in one super frame; and

Ap: the number of paging channel (PCH) slots per group, measures the levels of all candidate channels for assignment which are indicated as paging channels (PCH) to be used at times other than a time (Ab) 71 in which the B channel (BCCH) 53 is received and a time (Ab) 72 in which the paging channels (PCH) 55 are received, i.e., intermittent non-reception times, averages the levels in the respective channels, and updates the averaged levels at all times in a step S5.

After when there is an outgoing/incoming call in a step S6, the base station controller 3 measures an upstream interference signal level with the sector antenna 12, 14, or 16, and calculates upstream desired-to-interference signal level ratios for the candidate channels assigned in the step S3 to the mobile stations 18 using the upstream interference signal levels measured by the upstream interference signal level measuring means, in a step S7. The base station controller 3 determines all the channels whose upstream desired-to-interference signal level ratio is equal to or higher than a predetermined upstream desired-to-interference signal level ratio, as new candidate channels for assignment in a step S8, and requests the mobile station 18 to report the measured downstream interference signal level in a step S9.

In response to the request, the mobile station 18 immediately reports the downstream interference signal level which is being updated at all times to the base station controller 3 in a step S10.

Formats of a level report request and a level report which can be used in this embodiment will be described below with reference to FIGS. 8 and 9. Unlike conventional formats, a level report request 82 comprises, as shown in FIG. 8, a message type 31 and a plurality of (four in FIG. 8 for illustrative purpose) frequency codes 80, and a level report 83 comprises, as shown in FIG. 9, a message type 31 and a plurality of (four in FIG. 9 for illustrative purpose) reception levels 81. The four highest ranking channels whose upstream desired-to-interference signal level ratio is equal to or higher than a predetermined upstream desired-to-interference signal level ratio are indicated as four frequency codes 80 to the mobile station 18 in a step S9, and the mobile station 18 immediately reports four downstream interference signal levels that are being updated at all times to the base station 2 with the reception levels 81 in a step S10.

In response to the report, the base station controller 3 calculates downstream desired-to-interference signal level ratios using, as downstream desired signal levels, the received levels in its own zone of the outgoing or incoming radio condition report, in a step S11. The base station controller 3 then determines whether the calculated downstream desired-to-interference signal level ratios are equal to or greater than a predetermined signal level ratio threshold in a step S12. The base station controller 3 determines a channel with a maximum downstream desired-to-interference signal level ratio equal to or greater than the predetermined signal level ratio threshold as a communication channel in a step S15, and indicates the communication channel to the mobile station 18 in a step S13. If there is no channel whose downstream desired-to-interference signal level ratio is equal to or greater than the predetermined signal level ratio threshold in a step S17, then the base station controller 3 selects a new candidate channel for assignment in the step S8, and repeats the steps S8 through S12 until a usable candidate channel for assignment is found in the step S15.

Figure 10:
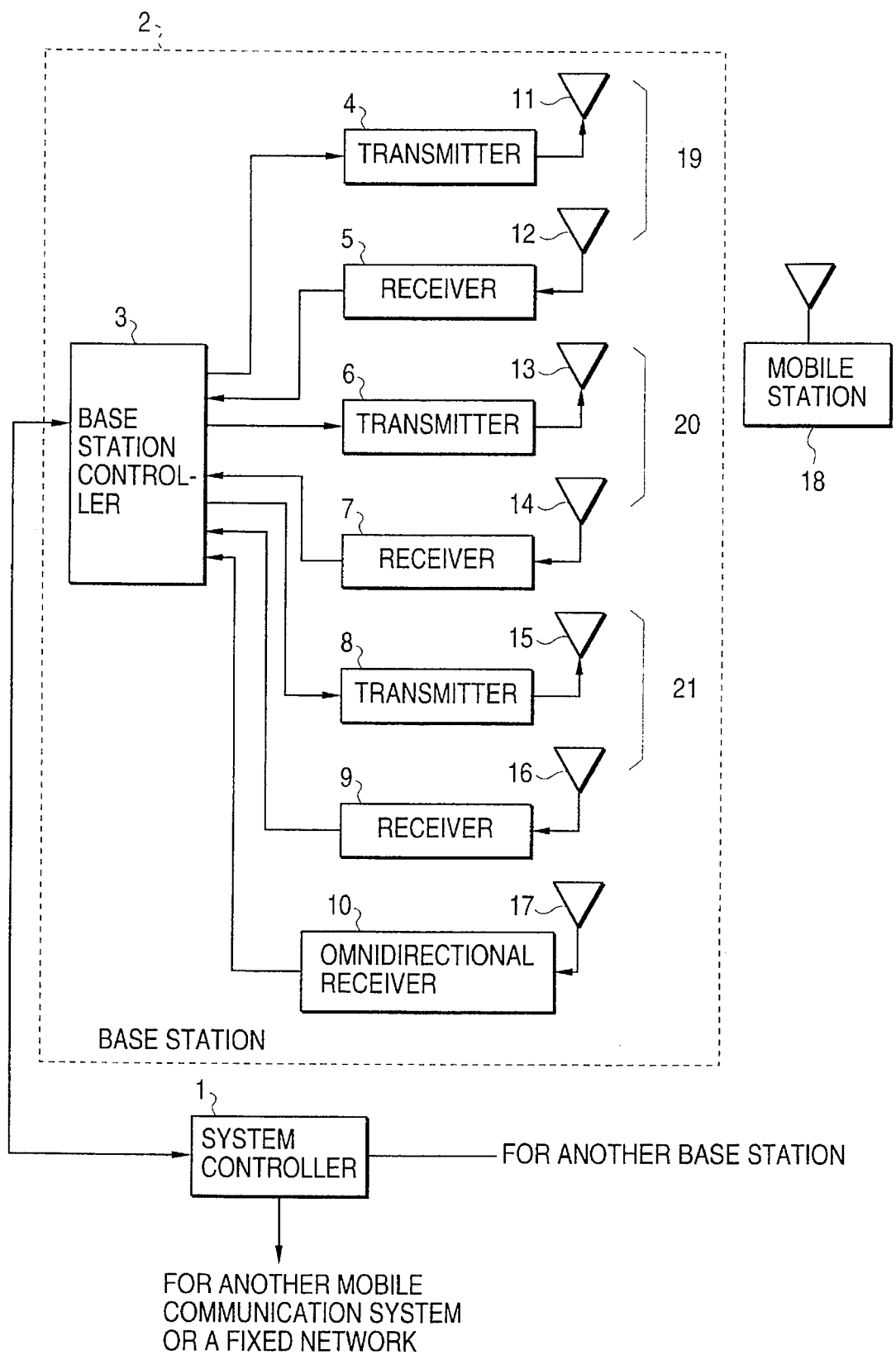
FIG. 10 is a block diagram of a second embodiment of a mobile communication system for radio zones each divided into sectors according to the present invention.

As shown in FIG. 10, another embodiment of a mobile communication system for radio zone each divided into sectors according to the present invention comprises an omnidirectional receiver 10 and an omnidirectional antenna 17 used in addition the constituents of the mobile communication system shown in FIG. 3.

The omnidirectional receiver 10 is connected to the omnidirectional antenna 17 and the base station controller 3.

Figure 4:
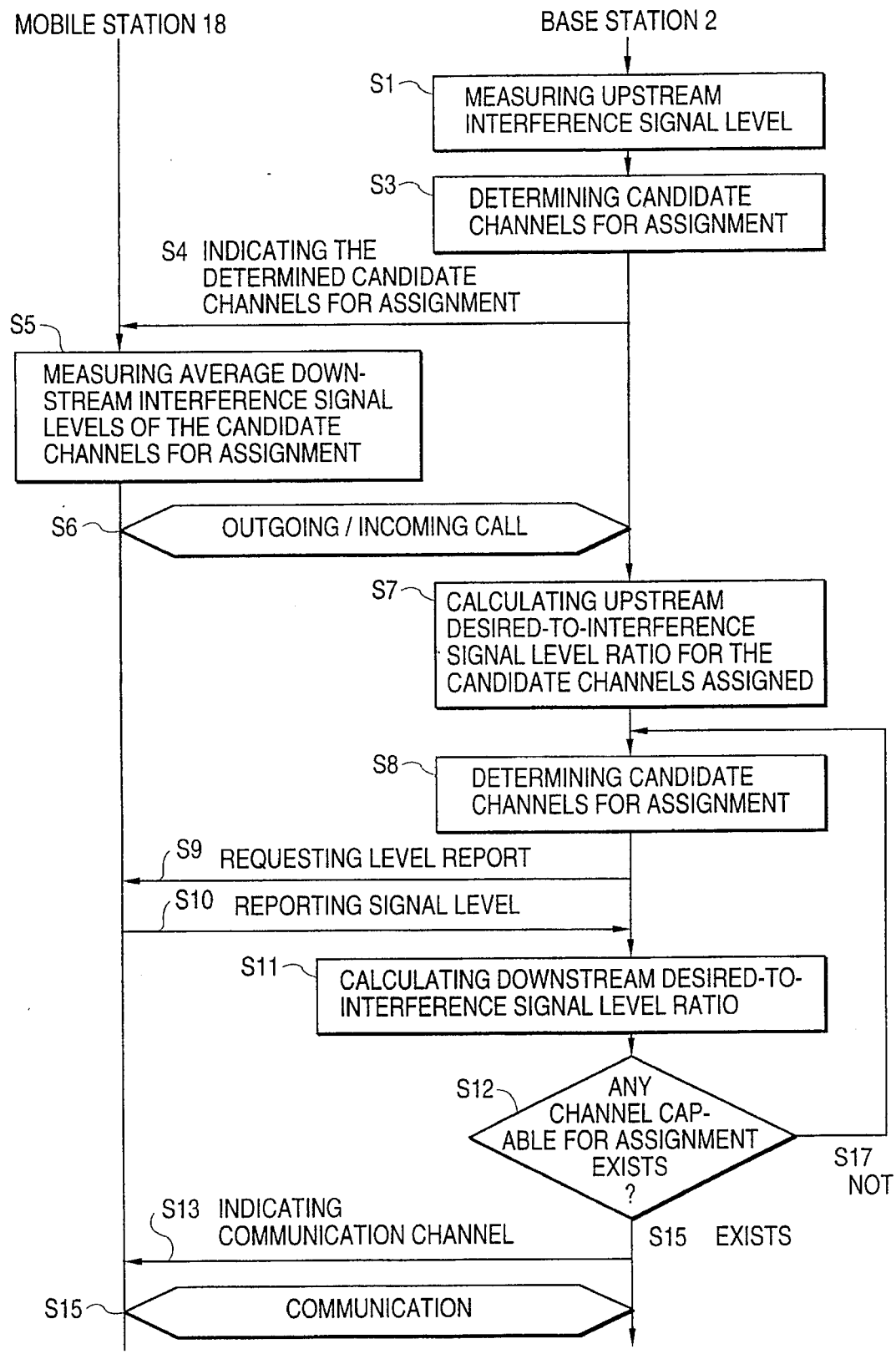
FIG. 4 is a flowchart of a process of channel assignment at the time an outgoing/incoming call is made in the mobile communication system shown in FIG. 3.

A process of assigning a channel in response to a communication request for the mobile communication system is the same as shown in FIG. 4. In the step S1, the base station controller 3 measures upstream interference signal levels in all communication channels assigned to its own base station 2 with the upstream interference signal level measuring means using the omnidirectional receivers 10 and the omnidirectional antenna 17.

In the mobile communication system according to the present invention, since upstream interference signal levels in communication channels in all directions are always measured by the upstream interference signal level measuring means, and since candidate channels for assignment are indicated to the mobile station before an outgoing/incoming call is made, based on the upstream interference signal levels that are measured by the upstream interference signal level measuring means, it is possible to measure downstream and upstream interference signal levels in those channels which are highly likely to simultaneously satisfy assignment conditions, i.e., upstream and downstream desired-to-interference signal level ratios, before an outgoing/incoming call is made. Therefore, the number of signals at the time an outgoing/incoming call is made is prevented from increasing, and the time required to measure downstream interference signal levels of mobile stations is held to a minimum or reduced to zero in some cases.

Candidate channels for assignment are rearranged into an ascending order of upstream interference signal levels, and divided and assigned to groups of mobile stations. Consequently, by assigning fewer shared channels to mobile stations, the time required to measure downstream interference signal levels before an outgoing/incoming call is made is shorter or the measured signal levels are closer to true signal levels than possible when many common candidate channels for assignment are assigned to all mobile stations associated with the same base station. Because different channels are assigned to groups of mobile stations, candidate channel numbers are prevented from colliding with each other and the time required before candidate channels are determined when many mobile stations simultaneously transmit and receive calls becomes short.

Although a certain preferred embodiment of the present invention has been shown and described in detail, it should be understood that various changes and modifications may be made therein without departing from the scope of the appended claims.

What is claimed is:

1. A mobile communication system comprising:

a plurality of base stations positioned respectively in a plurality of radio zones each divided into a plurality of sectors;

a plurality of sector antennas positioned respectively in the sectors of each of the radio zones; and a plurality of mobile stations that can be connected to the base stations through radio transmission paths, such that the mobile communication system is capable of transmitting and receiving a call by way of dynamic channel assignment based on simultaneous use of a same frequency or time slot under conditions free of mutual interference between the base stations;

each of the base stations including,
upstream interference signal level measuring means for continuously measuring upstream interference signal levels in communication channels of the mobile stations in all directions;
means for determining candidate channels for assignment to the mobile stations based on the upstream interference signal levels measured by said upstream interference signal level measuring means; and
means for indicating channel numbers of the candidate channels for assignment to all the mobile stations in the radio zone in which the base station is positioned;

each of the mobile stations including,
means for receiving the channel numbers of the candidate channels and measuring downstream interference signal levels in the candidate channels prior to when a call is transmitted and received; and
means for reporting the downstream interference signal levels in the candidate channels to the base station after when the call is transmitted and received.

2. A mobile communication system according to claim 1, wherein said upstream interference signal level measuring means comprises means for measuring upstream interference signal levels with all the sector antennas associated with each of the base stations.

3. A mobile communication system according to claim 1, wherein each of the base stations further includes an omnidirectional antenna and an omnidirectional receiver connected to the omnidirectional antenna, and wherein said upstream interference signal level measuring means measures upstream interference signal levels from the mobile stations using the omnidirectional antenna and the omnidirectional receiver.

4. A mobile communication system according to claim 1, wherein said means for determining candidate channels for assignment to the mobile stations comprises means for rearranging the candidate channels into an ascending order of upstream interference signal levels based on the measured upstream interference signal levels in the communication channels, and assigning the candidate channels to groups of the mobile stations prior to when the call is transmitted and received.

5. A mobile communication system according to claim 1, wherein said means for reporting the downstream interference signal levels in the candidate channels to the base station is activated after a communication connection request is generated.

6. A mobile communication method between a mobile station and a base station having a plurality of sector antennas for respectively providing radio communications within a plurality of zones, the method comprising the steps of:

a) measuring, at the base station, upstream interference signal levels for a plurality of communication channels;

b) determining, at the base station, candidate channels for assignment based on the measured upstream interference signal levels;

c) indicating the candidate channels for assignment to the mobile station;

d) measuring, at the mobile station, an average downstream interference signal level for each of the candidate channels for assignment;

e) establishing one of an outgoing call and an incoming between the mobile station and the base station;

f) calculating, at the base station, an upstream desired-to-interference signal level ratio for each of the candidate levels for assignment using the upstream interference signal levels measured during the step a);

g) determining, at the base station, which, if any, of the candidate channels for assignment have a corresponding upstream desired-to-interference signal level ratio which exceeds a first signal level ratio;

h) sending a request, by the base station to the mobile station, to report the average downstream interference signal level measured during the step d) for designated ones of the candidate channels for assignment, the designated ones having a corresponding upstream desired-to-interference signal level ratio calculated at the step f) which exceeds the first signal level ratio;

i) sending a report, from the mobile station to the base station, of the average downstream interference signal level measured at the step d) for each of the designated ones of the candidate channels for assignment;

j) calculating, at the base station, a downstream desired-to-interference signal level ratio for each of the designated ones of the candidate channels for assignment by using a received level of the report sent from the mobile station at the step i);

k) determining, at the base station, whether any of the calculated downstream desired-to-interference signal level ratios exceed a second signal level ratio; and l) if any of the calculated downstream desired-to-interference signal level ratios exceed the second signal level ratio, indicating a usable communication channel to the mobile station as one of the designated one of the candidate channels for assignment that has a corresponding calculated downstream desired-to-interference signal level ratio that exceeds the second signal level ratio.

7. The mobile communication method according to claim 6, further comprising the step of:

m) if none of the calculated downstream desired-to-interference signal level ratios exceed the second signal level ratio, repeating steps h) through k) for another one, if any, of the candidate channels for assignment which has a corresponding upstream desired-to-interference signal level ratio which exceeds the first signal level ratio.

8. The mobile communication method according to claim 6, wherein, in the step l), if more than one of the calculated downstream desired-to-interference signal level ratios exceed the second signal level ratio, indicating a usable communication channel to the mobile station as a communication channel having a highest calculated downstream desired-to-interference signal level ratio that exceeds the second signal level ratio.

* * * * *